United States Patent
Metzger et al.

(10) Patent No.: US 11,114,814 B2
(45) Date of Patent: Sep. 7, 2021

(54) RELATIVE PHASE MEASUREMENT FOR COHERENT COMBINING OF LASER BEAMS

(71) Applicant: TRUMPF Scientific Lasers GmbH + Co. KG, Unterfoehring (DE)

(72) Inventors: Thomas Metzger, Munich (DE); Matthias Haefner, Munich (DE)

(73) Assignee: TRUMPF Scientific Lasers GmbH + Co. KG, Unterfoehring (DE)

(*) Notice: Subject to any disclaimer, the term of this patent is extended or adjusted under 35 U.S.C. 154(b) by 466 days.

(21) Appl. No.: 16/039,263

(22) Filed: Jul. 18, 2018

(65) Prior Publication Data

US 2019/0052045 A1 Feb. 14, 2019

Related U.S. Application Data

(63) Continuation of application No. PCT/EP2017/050787, filed on Jan. 16, 2017.

(30) Foreign Application Priority Data

Jan. 18, 2016 (DE) .......................... 10 2016 100 721.8

(51) Int. Cl.
*H01S 3/10* (2006.01)
*G01J 9/00* (2006.01)
(Continued)

(52) U.S. Cl.
CPC ............ *H01S 3/10053* (2013.01); *G01J 9/00* (2013.01); *G01J 9/02* (2013.01); *H01S 3/10061* (2013.01);
(Continued)

(58) Field of Classification Search
CPC .. H01S 3/10061; H01S 3/1305; H01S 3/1307; H01S 3/1308; H01S 3/235;
(Continued)

(56) References Cited

U.S. PATENT DOCUMENTS

| 7,058,098 | B1 | 6/2006 | Shay | |
| 2009/0201575 | A1* | 8/2009 | Fermann | H01S 3/06745 |
| | | | | 359/341.32 |

(Continued)

FOREIGN PATENT DOCUMENTS

| CN | 101382665 A | 3/2009 |
| CN | 101424570 | 5/2009 |

(Continued)

OTHER PUBLICATIONS

CN Office Action in CN Appln. No. 201780018243.X, dated Jan. 17, 2020, 12 pages (with English translation).

(Continued)

*Primary Examiner* — Eric L Bolda
(74) *Attorney, Agent, or Firm* — Fish & Richardson P.C.

(57) ABSTRACT

A phase control system for controlling the relative phase ($\varphi$) of two laser beams of a laser system, which are to be coherently combined, is disclosed that enables providing a phase-controlled sum laser beam. An optical system of the phase control system includes a beam input for receiving a measuring portion of two collinear coherent laser beams, which are superimposed to form a sum laser beam, and provides measuring beams or measuring beam regions, which are used with associated photodetectors for outputting photodetector signals. For determining the relative phase from the photodetector signals, the phase control system has an evaluation device and a delay device for being inserted into the beam path of at least one of the two laser beams. The optical system is configured such that the measuring beams or measuring beam regions are related to different phase offsets.

26 Claims, 5 Drawing Sheets

(51) Int. Cl.
*H01S 3/23* (2006.01)
*H01S 3/13* (2006.01)
*G01J 9/02* (2006.01)

(52) U.S. Cl.
CPC .......... *H01S 3/1305* (2013.01); *H01S 3/1307* (2013.01); *H01S 3/1308* (2013.01); *H01S 3/235* (2013.01); *H01S 3/2383* (2013.01)

(58) Field of Classification Search
CPC ...... H01S 3/2383; H01S 3/10053; G01J 9/02; G01J 2009/0223; G01J 2009/0261
See application file for complete search history.

(56) References Cited

U.S. PATENT DOCUMENTS

| | | | |
|---|---|---|---|
| 2010/0225897 A1 | 9/2010 | Fermann et al. | |
| 2013/0235448 A1 | 9/2013 | Klenke et al. | |
| 2014/0269790 A1* | 9/2014 | Sebastian | G01S 17/34 372/20 |
| 2015/0138618 A1 | 5/2015 | Hamamoto et al. | |

FOREIGN PATENT DOCUMENTS

| | | |
|---|---|---|
| CN | 101159365 A | 9/2009 |
| CN | 101939880 A | 1/2011 |
| CN | 102349205 A | 2/2012 |
| CN | 103033944 A | 4/2013 |
| CN | 103513428 A | 1/2014 |
| CN | 105122561 A | 12/2015 |
| DE | 102010052950 | 3/2012 |
| EP | 2806302 | 11/2014 |
| WO | WO 2006/083998 A3 | 8/2006 |
| WO | WO 2012/028287 A2 | 3/2012 |

OTHER PUBLICATIONS

Xiong et al., "Coherent beam combination of adaptive fiber laser array with tilt-tip and phase-locking control," Chin. Phys. B, 2013, 22(2):024206-1-024206-6.

Augst et al., "Coherent beam combining and phase noise measurements of ytterbium fiber amplifiers," Opt. Lett, 2004, 29: 474-476.

Hänsch et al., "Laser frequency stabilization by polarization spectroscopy of a reflecting reference cavitay," Opt. Comm, Dec. 1980, 35: 441-444.

International Search Report and Written Opinion in International Application No. PCT/EP2017/050787, dated Apr. 12, 2017, 14 pages (with English translation).

Kiryanov et al., "Laser linear and angular displacement interferometer," Avtometriya, 1994, 58-61.

Klenke et al., "Coherently-combined two channel femtosecond fiber CPA system producing 3 mJ pulse energy," Nov. 2011, Optics Express, 19: 24280.

Metzger et al., "High-repetition-rate picosecond pump laser based on a Yb:YAG disk amplifier for optical parametric amplification," Opt. Lett, 2009, 34: 2123-2125.

Seise et al., "Coherent addition of fiber-amplified ultrashort laser pulses," Optics Express, Dec. 2010, 18: 27827 (9 pages).

Teisset et al., "300 W Picosecond Thin-Disk Regenerative Amplifier at 10 kHz Repetition Rate," Advanced Solid Lasers Congress Postdeadline Papers; OSA2013, 2013, 3 pages.

CN Decision to Grant in Chinese Appln. No. 201780018243.X, dated Jan. 7, 2021, 9 pages (with English translation).

CN Office Action in CN Appln. No. 201780018243.X, dated Sep. 30, 2020, 4 pages (with English translation).

EP Office Action in European Appln. No. 17702012.0, dated Sep. 30, 2019, 5 pages (with English translation).

* cited by examiner

RELATIVE PHASE MEASUREMENT FOR COHERENT COMBINING OF LASER BEAMS

CROSS REFERENCE TO RELATED APPLICATIONS

This application is a continuation of and claims priority under 35 U.S.C. § 120 from PCT Application No. PCT/EP2017/050787 filed on Jan. 16, 2017, which claims priority from German Application No. DE 10 2016 100 721.8, filed on Jan. 18, 2016. The entire contents of each of these priority applications are incorporated herein by reference.

TECHNICAL FIELD

The present invention relates to methods, devices, and systems for the coherent combining of laser beams, and in particular to phase control systems for controlling relative phases of laser beams to be coherently combined.

BACKGROUND

Coherent combining allows several parallel amplifier stages (e.g., fiber amplifiers, multi-pass amplifiers, or regenerative amplifiers) and/or oscillators to be optically combined such that a single output beam is formed. When coherently combining two laser beams, the polarization state of the sum beam and in particular the stability of the polarization state are decisive performance features.

For fiber-based amplifier systems, various research groups demonstrated coherent combining, see, e.g., "Coherent addition of fiber-amplified ultrashort laser pulses", E. Seise, et al., 20 Dec. 2010, Vol. 18, No. 26, OPTICS EXPRESS 27827, and "Coherently-combined two channel femtosecond fiber CPA system producing 3 mJ pulse energy", A. Klenke et al., 21 Nov. 2011, Vol. 19, No. 24, OPTICS EXPRESS 24280.

It is generally known to determine the polarization state using measurement methods such as Hansch-Couillaud detection (HCD) or Pound-Drewer-Hall detection, see, e.g., "Laser frequency stabilization by polarization spectroscopy of a reflecting reference cavity", T. W. Hansch et al., 1980 Opt. Comm. 35 (3). In some cases, heterodyne measurement methods are used, which are, however, less suitable for short pulse laser systems with low repetition rates; see, e.g., "Coherent beam combining and phase noise measurements of ytterbium fiber amplifiers", S. J. Augst, et al., 2004 Opt. Lett. 29 (5).

SUMMARY

The present disclosure provides methods, devices, and systems for controlling relative phases between laser beams to be combined and for enabling stable coherent combinations in laser systems.

One aspect of the present invention provides phase control systems for controlling a relative phase of two—to be coherently combined—laser beams of a laser system. The phase control system is intended to provide a phase-controlled sum laser beam, and has an optical unit (or an optical system). The optical unit includes a beam input for receiving a measuring portion of two collinear coherent laser beams, which are to be superimposed to form a sum laser beam, where the laser beams have in particular substantially orthogonal polarization states. The optical unit further includes a beam splitter for generating at least three measuring beams from the coherent laser beams of the measuring portion, which propagate on associated measuring beam paths.

Alternatively, the optical unit includes a propagation section in which the coherent laser beams of the measuring portion propagate spatially superimposed at an angle and form at least three measuring beam regions. Thereby, the at least three measuring beam paths of the at least three measuring beams are formed by projection onto adapted polarization directions, or the at least three measuring beam regions are formed by path length differences to generate different phase offsets of the associated measuring beams or measuring beam regions. Furthermore, the optical unit includes at least three photodetectors for outputting photodetector signals. The photodetectors are assigned to one of the measuring beam paths or one of the measuring beam regions, respectively, and the photodetector signals correspond to the measuring beams or measuring beam regions at the different phase offsets. Furthermore, the optical unit includes an evaluation unit (or an evaluation device). Based on the at least three photodetector signals, the evaluation unit generates a control signal. Based on an evaluation of a polarization state or an interference behavior of the measuring portion, the control signal corresponds to a relative phase between the coherent laser beams. The optical unit further includes a delay device for being inserted into the beam path of at least one of the two laser beams that are to be superimposed collinearly. The delay device has an optical path length that is adjustable in dependence on the control signal.

In one embodiment, a phase control system for controlling the relative phase of two—to be coherently combined—laser beams of a laser system, which is intended to provide a phase-controlled sum laser beam, has an optical unit (or an optical system). The optical unit includes a beam input for receiving a measuring portion of two collinear coherent laser beams superimposed to form a sum laser beam, a beam splitter for generating (at least) three measuring beams from the measuring portion, (at least) three measuring beam paths for the (at least) three measuring beams. The measuring beam paths are respectively adapted to project a polarization state of an associated measuring beam onto a polarization direction. The optical unit includes further (at least) three photodetectors each associated with one of the measuring beam paths for outputting photodetector signals corresponding to the measuring beams projected onto the polarization directions. Furthermore, the phase control system includes an evaluation unit (or an evaluation device) which, based on the (at least) three photodetector signals, generates a control signal that corresponds to a relative phase between the coherent laser beams based on an evaluation of a polarization state of the measuring portion. The phase control system further includes a delay device to be inserted into the beam path of at least one of the two laser beams to be collinearly superimposed. The delay device includes an optical path length that is adjustable in dependence on the control signal.

In a further embodiment, such a phase control system has an optical unit (or an optical system) for generating two measuring beams corresponding to the coherent laser beams, which propagate in a propagation section at a splitting angle and are spatially superimposed in a central region. The optical unit also has a polarization filter, e.g., positioned in the interference range, for generating interfering polarization states, whereby the polarization states lead to an interference strip pattern (interference fringes) in a direction that is given by the splitting angle. The central region includes at least three measuring beam regions with defined local differing phase offsets. Furthermore, the optical unit has at least three photodetectors, each assigned to one of the measuring beam regions, for outputting photodetector signals relating to the different phase offsets. The optical unit has as well as an evaluation unit as described above and a delay device as described above.

Another aspect of the present disclosure features laser systems for providing a sum laser beam based on coherent combination that includes a seed laser beam source for providing a first seed laser beam and a second seed laser beam, which is coherent with the first seed laser beam, a first amplifier branch including a first optical amplifier unit for generating a first amplified laser beam based on the first seed laser beam, and a second amplifier branch including a second optical amplifier unit for generating a second amplified laser beam based on a second seed laser beam portion. Furthermore, the laser system includes a combination unit (or an optical combiner) for collinearly superimposing the beam path of the first amplified laser beam and the beam path of the second amplified laser beam to generate a sum laser beam. Thereby, the first laser beam in a first polarization state and the second laser beam in a second polarization state, which is different from the first polarization state, are overlaid. Furthermore, the laser system has a phase control system as outlined above, whereby a part of the sum laser beam is coupled into the beam input of the optical unit as a measuring portion and the delay device is provided in the first amplifier branch and/or in the second amplifier branch.

Another aspect of the present disclosure features laser systems for providing a sum laser beam based on coherent combination that includes a laser beam source for providing a first laser beam and a second laser beam coherent to the first laser beam, a combination unit (or an optical combiner) for collinear superposition of the beam path of the first laser beam and the beam path of the second laser beam for generating the sum laser beam, where the first laser beam in a first polarization state and the second laser beam in a second polarization state different from the first polarization state are superimposed, and a phase control system as outlined above. Thereby, a part of the sum laser beam is coupled into the beam input of the optical unit as measuring portion, and the delay device is provided in the beam path of the first laser beam and/or in the beam path of the second laser beam.

A further aspect of the present disclosure features methods for coherent combining of laser beams including the following steps: superimposing two laser beams having different polarization states on a common propagation path to form a sum laser beam, determining a relative phase between the two laser beams, and adjusting an optical path length difference to stabilize the polarization state of the sum laser beam in a substantially intensity-independent homodyne measurement procedure.

The interferometric measuring principle, which is described herein for some embodiments and underlies the above aspects, is based on a kind of homodyne phase measurement between two contributing polarization components.

Compared to the Hansch-Couillaud-Detection (HCD) mentioned in the Background, the concepts disclosed herein have the advantage of intensity independence. When using HCD, for example, a phase stability in the range of 0.1 rad (radian) rms (root mean square) is reported, whereby HCD cannot distinguish between intensity fluctuations and phase fluctuations. The latter can have the consequence that, when HCD is used in a control loop, additional phase disturbances are imposed on the combined sum laser beam due to occurring intensity fluctuations in the input beams.

Compared to HCD, the interferometric measuring principle disclosed herein allow a separation of intensity fluctuations and phase fluctuations. Thus, the interferometric measuring principle disclosed herein enables better phase stabilization. Furthermore, the measuring principle makes it possible to compensate for intensity fluctuations in the output beam by specifically introducing elliptical polarization and subsequent polarization filtering. It is known from length measurement interferometry that, when measuring a length, resolution limits in the range of 0.001 rad rms and better can be achieved for the phase measurement. Based on the measuring principle disclosed herein, those resolution limits can be transferrable to the measurement of a relative phase.

Furthermore, the phase detection disclosed herein can, in principle, be applied to a wide range of laser repetition rates. For example, at low laser repetition rates, the photodetector signals can be isolated and evaluated for each individual laser pulse (single-shot evaluation). Thereby, the control bandwidth of the phase stabilization can be kept very wide. An example of data processing, which allows single-shot evaluation, is a "sample-and-hold" implementation in the photodetectors.

In some embodiments of laser systems, laser beams can be combined with thin-film polarizers, in particular at high laser powers.

In general, the splitting into the measuring beams can be done with non-polarizing beam splitters such as diffraction gratings or partially reflecting mirror combinations.

Herein, concepts are disclosed that improve aspects of the prior art. In particular, additional features and their usefulness result from the following description of embodiments on the basis of the drawings.

DETAILED DESCRIPTION

Aspects described herein are partly based on the realization that, when combining two laser beams coherently, an essentially intensity-independent measurement of the polarization state of the sum laser beam allows an improved control of the coherent superposition of the partial beams. Fluctuations in the laser power can be reduced by avoiding or reducing the intensity dependence of the phase measurement in its influence on the coherent combination.

The measurement of the polarization state can be performed by a measurement of the relative phases between the two input beams. For example, the interferometric measuring principle disclosed herein and a corresponding downstream signal processing make it possible to determine the phase with high linearity essentially largely independent of the intensity. For example, such an intensity-independent phase value for the phase difference (i.e., the relative phase) can be provided in the form of a quadrature signal. In particular, the measurement of the polarization state can be performed indirectly via the phase between the two orthogonal polarizations based on the evaluation of interference fringes.

In addition to the intensity independence, the embodiments disclosed herein can, inter alia, enable a simple adjustment (in particular due to the disclosed common-path configurations of the phase measurement) and the embodiments can be configured to be insensitive to vibrations and drift events. This is a difference compared to HCD, which is based on an in itself stable reference cavity. Moreover, the embodiments disclosed herein can also provide an unambiguous phase signal even for large phase jumps. In addition, this is a difference from HCD, for which a drifting out of the resonance range can lead to ambiguity.

The aim of coherent combination is to combine a plurality of laser beams generated, for example, with parallel amplifier stages and/or oscillators, into a single output laser beam. This requires coherence of the laser beams, so that all amplifier stages are fed with coherent laser light, for example coherent laser pulses.

In the following, the concept is exemplarily utilized with a laser system including a common seed laser as a source for two regenerative amplifier stages, so that coherent amplified laser beams can be combined.

Figure 1:
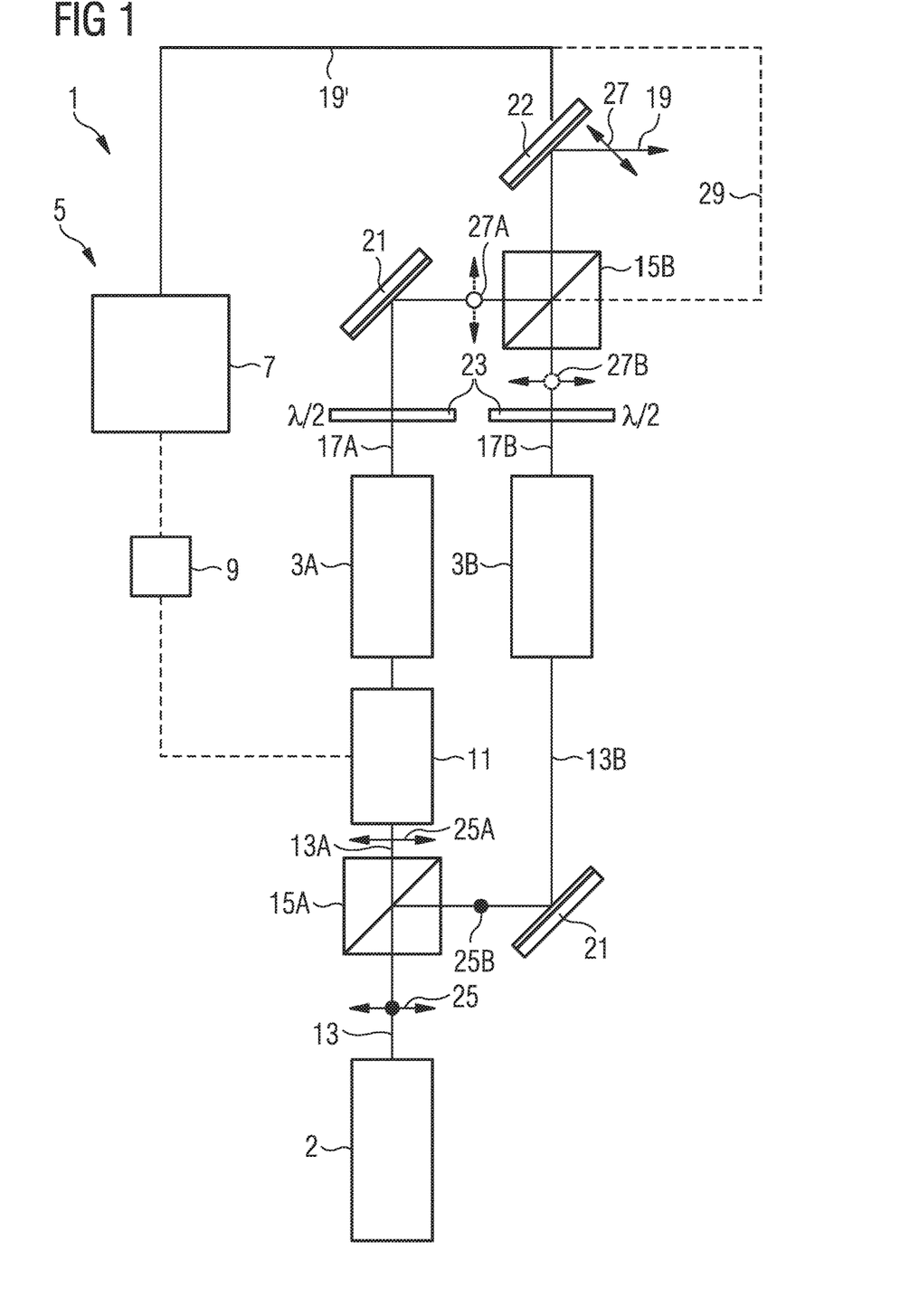
FIG. 1 is a schematic illustration of a laser system with a seed laser, two regenerative amplifier units, and a phase control system.

FIG. 1 shows schematically an exemplary laser system 1 with a seed laser 2 as seed laser beam source, two regenerative amplifier units 3A, 3B, and a phase control system 5. The phase control system 5 includes, for example, an optical unit (or an optical system) 7, an evaluation unit (or an evaluation device) 9, and a delay device 11. A primary laser beam 13 of the seed laser 2 is divided by a beam splitter 15A into two (coherent) partial beams, which are indicated in FIG. 1 as a first seed laser beam 13A and a second seed laser beam 13B. Each partial beam is supplied to the respective amplifier unit 3A, 3B to generate a first amplified laser beam 17A based on the first seed laser beam 13A and a second amplified laser beam 17B based on the second seed laser beam 13B, respectively. With the help of a further beam splitter 15B, the amplified laser beams 17A, 17B are collinearly superimposed to form a sum laser beam 19.

The interferometric measuring principle disclosed herein can be used similarly for the coherent superposition of non-amplified and/or amplified laser beams. Thus, in configurations similar to that shown in FIG. 1 with none or only one of the amplifier units 3A, 3B, coherent non-amplified and/or amplified laser beams can be superimposed, where the delay device 11 is to be provided at least in one of the two superimposed beam paths.

The conglomerate of the two regenerative amplifier units 3A, 3B with the beam splitters 15A, 15B positioned upstream and downstream represents a Mach-Zehnder interferometer. The beam splitters 15A, 15B can be configured as beam splitter cubes and/or thin film polarizers. At the output of this Mach-Zehnder interferometer, which is formed by the two regenerative amplifier units 3A, 3B, the superposed sum laser beam 19 is obtained with whatever kind of polarization state.

In FIG. 1, deflecting mirrors 21 and lambda half waveplates 23 for changing the polarization states of the different laser beams are also shown schematically. It can be seen that the primary laser beam 13 has a polarization state 25 superposed from two polarization states with respect to the function and orientation of the beam splitter 15A. Thereby, the two polarization states 25A, 25B (for example, P and S polarization) characterize the first seed laser beam 13A and the second seed laser beam 13B after the beam splitting and two polarization states are further maintained in the amplifier units 3A, 3B.

In the embodiment of FIG. 1, the polarizations of the amplified laser beams 17A, 17B are accordingly aligned with the lambda half waveplates 23 for the superposition in the second beam splitter 15B. For example, the output polarization of each amplifier unit 3A, 3B can be set such that the amplified laser beam 17A is reflected in a polarizing beam splitter cube and the amplified laser beam 17B is transmitted. At the output of beam splitter 15B, the superposition of both beams is obtained, so that the sum laser beam 19 is characterized by a polarization state 27, which is based on the superposition of the polarization states 27A, 27B of the amplified laser beams 17A, 17B. In alternative embodiments, the beam splitter 15B can be interchanged, for example, with the deflecting mirror 21, so that waveplates are not necessarily required for the superposition.

The use of lambda half waveplates 23 shown in FIG. 1 also allows setting the intensity situation correctly and, thereby, adjusting the contributions of the amplified laser beams and accordingly their polarization states to the sum laser beam 19.

In the embodiment shown in FIG. 1, the combined sum laser beam 19 can be understood as the superposition of two orthogonal linear polarization states with variable phase shift. The phase shift is based inter alia on different optical path lengths in the amplifier units 3A, 3B. The optical path length in the amplifier unit can be adjusted exemplarily with the delay device 11. For example, in the case of delay devices based on piezo elements, path length changes of several 100 micrometer (μm) can become possible, while in the case of a combination of piezo element and linear displacement table, path length changes of several centimeters (cm) can become possible. In pulsed systems, the delay device 11 includes, for example, a retroreflector arranged on a translation unit for superimposing the pulse envelope and a piezo arrangement for high-resolution phase matching. Acousto-optical delay units can also be used. In particular, high-resolution phase matching is part of the phase control system 5.

As shown in FIG. 1, the phase control system 5 can, for example, use the light transmitted in the output beam path by a deflecting mirror 22 (herein also referred to as measuring portion 19') for the measurement, or it can use the beam emerging at a second output of the combining beam splitter 15B (dotted beam path 29 in FIG. 1).

The phase control system 5 is configured such that the polarization state of the sum laser beam is measured such that the polarization state of the sum laser beam can be stabilized with the delay device 11. Thereby, a coherent combination with a quasi-constant relative phase can be accomplished. Such coherently combined laser beams, for example, form a basis for constant and reproducible experimental boundary conditions.

Figure 2:
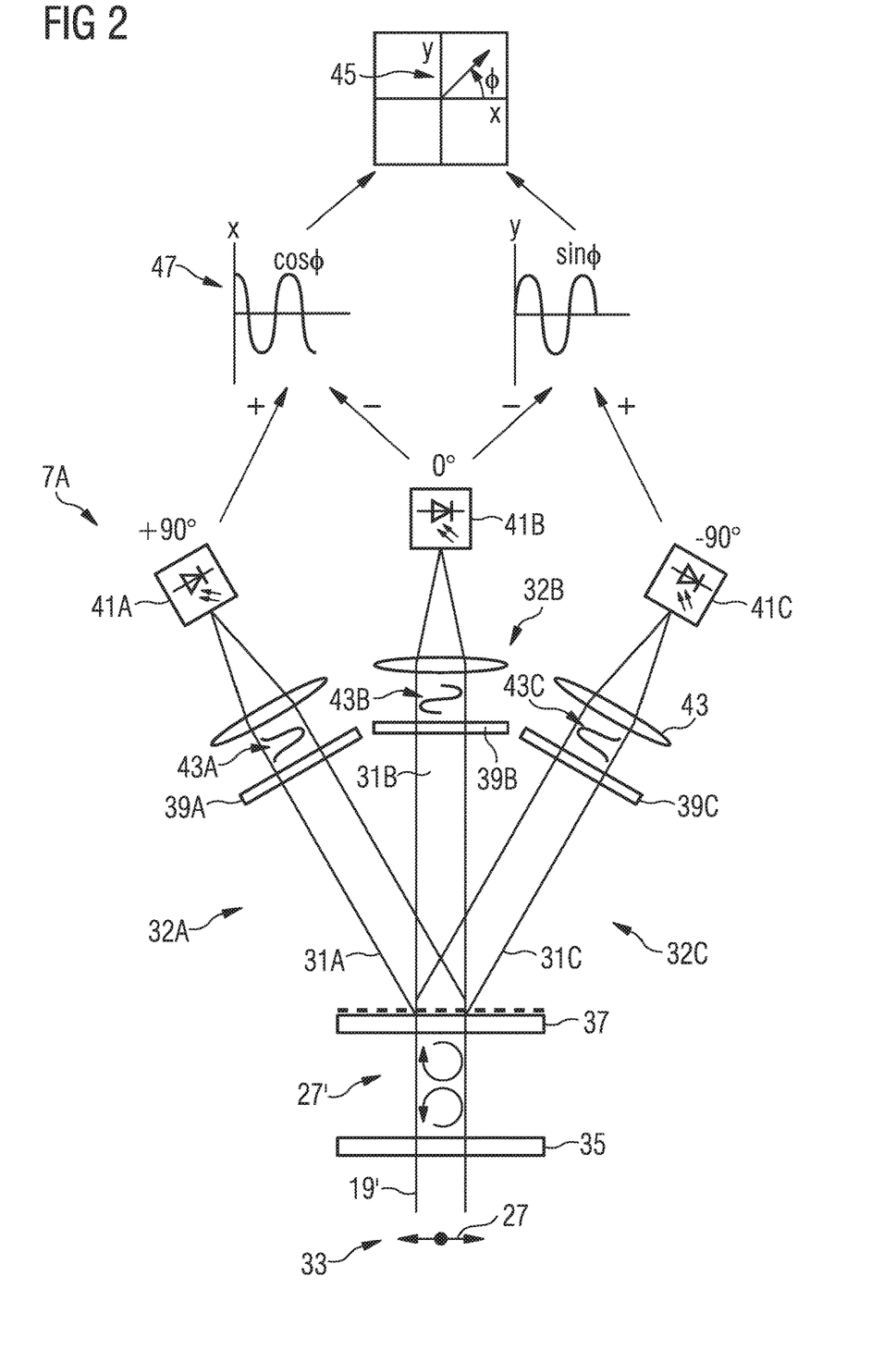
FIG. 2 is a schematic illustration of a first exemplary optical unit of a phase control system.

FIG. 2 shows a first exemplary setup of an optical unit 7A and illustrates further the signal acquisition and evaluation. The optical unit 7A can be used as the optical unit 7 of the phase control system 5 of FIG. 1.

In the concept for phase analysis and subsequent control, which is explained below, one uses collinear superimposed partial beams in the form of a measuring portion 19' of the sum laser beam 19 for phase measurement. The concept is based on the different polarization states 27A, 27B of the coherent partial beams 17A, 17B to be combined.

The measuring portion 19' has the polarization state 27 of the sum laser beam 19, which follows, inter alia, from the phase between the two coherently combined partial beams 17A, 17B. The polarization state 27 is measured using three measuring beams 31A, 31B, and 31C and is stabilized accordingly by optical delay of one of the two partial beams 17A, 17B. The evaluation does not take place via a fringe pattern, which would be an indication for an angle between the partial beams, but via intensity signals of specific polarization components, which are generated with the three measuring beams 31A, 31B, 31C. As exemplarily illustrated in connection with FIGS. 2 to 4, in some embodiments only three signals are to be evaluated with simple algorithms to obtain an intensity-independent phase signal. This makes measurement rates into the MHz range possible.

The optical unit 7A shown in FIG. 2 represents a common-path interferometer whose core property consists in transforming temporal phase fluctuations between the two beams 17A, 17B, which are superimposed at the output of the Mach-Zehnder configuration of the amplifier units 3A, 3B described above and that are orthogonally polarized to each other, into a linear phase vector with variable direction, which characterizes the sum laser beam 19. Such optical systems are sometimes referred to as geometric-phase interferometers. Common-path interferometers are length measuring interferometers and phase detectors for interference lithography. see, e.g., "Laser linear and angular displacement interferometer", V. P. Kiryanov, et al., Optoelectronics, Instrumentation and Data Processing, No. 4, 1994 Avtometriya.

According to the concepts disclosed herein, an additional interferometer is used for phase detection, thereby allowing essentially pure phase information to be obtained.

Furthermore, in contrast to the common-path interferometer, the orthogonal polarizations would be projected in a classical Mach-Zehnder interferometer onto a common plane to obtain interference. Thereby, the possibility of having an intensity-independent quadrature signal can be lost. The common-path property makes the setup disclosed herein in particular robust with regard to alignment errors, vibrations, etc.

According to the concept disclosed herein, the measurement of the relative phase is done using a purely phase-sensitive interferometer.

In the optical unit 7A, the measuring portion 19' is recorded at the beam input 33, and a phase-dependent polarization vector is imprinted with the help of a lambda quarter plate 35. With reference to the polarization states 27A, 27B of the amplified laser beams 17A, 17B, the lambda quarter plate 35 converts the two linear polarizations underlying the polarization state 27 into two inverse circular polarizations 27'. Like the superposition of linear polarizations, the superposition of these two circular polarizations 27' leads to a linear polarization whose orientation depends on the relative phase of the circular polarizations or the orthogonal input polarizations. The relative phase is accordingly converted into the orientation of the resulting polarization vector. Thereby, a complete rotation of the polarization vector corresponds to a relative phase shift of one wavelength.

A diffraction grating 37 splits the measuring portion 19' with the phase-dependent polarization vector into the three measuring beams 31A, 31B, 31C, to which corresponding measuring beam paths 32A, 32B, 32C are assigned. In each measuring beam path 32A, 32B, 32C, there is a linear polarizer 39A, 39B, 39C. The intensity downstream/behind the polarizers 39A, 39B, 39C is converted into electrical signals with a photodiode 41A, 41B, 41C, respectively. The electrical signals are then fed, e.g., to control electronics of the evaluation unit 9. For measuring beams with large diameters, the measuring beam paths 32A, 32B, 32C can further include a lens 43 to focus the measuring beams on the photodiodes 41A, 41B, 41C.

If the polarization vector of each measuring beam 31A, 31B, 31C, which rotates depending on the relative phase, passes through the respective polarizer 39A, 39B, 39C, the intensity downstream the polarizer 39A, 39B, 39C is proportional to the projection of the polarization vector onto the transmission plane of the polarizer 39A, 39B, 39C. The intensity is therefore a sine function with the period lambda/2, where lambda is the mean wavelength of the laser radiation. The pass direction of the polarizers 39A, 39B, 39C determines, therefore, the phase of a sinusoidal intensity signal, which is detected by the photodiodes 41A, 41B, 41C. Exemplary intensity curves 43A, 43B, 43C are shown schematically in FIG. 2.

However, each of the intensity curves 43A, 43B, 43C is also dependent on the intensities of the amplified laser beams 17A, 17B. The splitting into the three measuring beams 31A, 31B, 31C now allows the generation of an intensity-independent phase vector 45 by difference formation of two pairs of photodetector signals. For that purpose, as shown schematically in FIG. 2 with polarizers 39A, 39B, 39C, projections in three spatial directions are done, so that three sinusoidal signals with the relative phases "+90°", "0°" and "−90°" are obtained, hereinafter referred to as I(+90°), I(0°), and I(−90°).

If differences of the sinusoidal signals of the photodiodes 41A, 41B, 41C are formed according to I(+90°)−I(0°) and I(−90°)−I(0°), then two signals I(+45°) and I(−45°) are obtained, which together represent a quadrature signal 47 with X and Y values. Intensity fluctuations of the amplified laser beams 17A, 17B respectively result in only an amplitude change, which is identical for both signals I(+45°) and I(−45°).

The relative phase $\varphi$ can now be determined according to $\varphi=\arctan(4+45°)/I(-45°))$, whereby the identical amplitude changes are removed. The phase signal, which is thereby generated and determines the relative phase between the amplified laser beams 17A, 17B, in particular the phase vector 45, can be used as an error signal of a phase stabilization control loop. The phase stabilization control loop can be used in particular to control the delay device 11.

In the following, the intensity independence of the phase measurement is exemplarily explained. It is assumed that two input beams are orthogonally polarized in the x and y directions and the y-polarized beam has a phase shift $\varphi$ to the x-polarized beam. To simplify matters, it is also assumed that the waveplate 35 is loss-free and that the E-field is divided into two orthogonal components (corresponding to the axes of the waveplate) having the same amplitude.

For the x-polarized beam and the y-polarized beam, the E-fields $U_x(t)$ [E-field of the first input beam, x-polarized] and $U_y(t)$ [E-field of the second input beam, y-polarized] can be respectively written as follows, when considering a $\lambda/4$-plate, performing a vectorial separation in fast axis and slow axis under the ideal situation with the same amplitudes in both axes:

| | |
|---|---|
| $U_x(t) = \hat{U}_x \sin(\omega t)$ | E-field of the first input beam, x-polarized |
| | λ/4-plate, vectorial separation in fast and slow axis |
| | here ideal situation: same amplitudes in both axes |
| $= \hat{U}_{xf}\sin(\omega t) + \hat{U}_{xs}\sin(\omega t - \frac{\pi}{2})$ | |
| $= \frac{\hat{U}_x}{\sqrt{2}}(\sin(\omega t) + \sin(\omega t - \frac{\pi}{2}))$ | |
| $U_y(t) = \hat{U}_y \sin(\omega t + \varphi)$ | E-field of the second input beam, y-polarized |
| | φ phase shift |
| $= \hat{U}_{yf}\sin(\omega t + \varphi) + \hat{U}_{ys}\sin(\omega t + \varphi - \frac{\pi}{2})$ | |
| $= \frac{\hat{U}_y}{\sqrt{2}}(\sin(\omega t + \varphi) + \sin(\omega t + \varphi - \frac{\pi}{2}))$ | |

After the two beams have been superimposed, the sum laser beam results as:

$$U_x(t) + U_y(t) =$$

$$\frac{1}{\sqrt{2}}(\hat{U}_x\sin(\omega t) + \hat{U}_y\sin(\omega t + \varphi) + \hat{U}_x\sin(\omega t - \frac{\pi}{2}) + \hat{U}_y\sin(\omega t + \varphi - \frac{\pi}{2})) =$$

$$\frac{1}{\sqrt{2}}(\hat{U}_f\sin(\omega t + \varphi_f) + \hat{U}_s\sin(\omega t + \varphi_s))$$

Thereby, the amplitudes $\hat{U}_f$, $\hat{U}_s$ and phases $\varphi_f$, $\varphi_s$ were combined in the fast or slow axis direction of the waveplate:

$$\hat{U}_f = \sqrt{\hat{U}_x^2 + \hat{U}_y^2 + 2\hat{U}_x\hat{U}_y\cos\varphi}$$

$$\hat{U}_s = \sqrt{\hat{U}_x^2 + \hat{U}_y^2 + 2\hat{U}_x\hat{U}_y\cos(\varphi - \frac{\pi}{2})}$$

Determining the intensities $I_f$ and $I_s$ in the two axis directions, the intensities show the same dependencies from $\hat{U}_x$ und $\hat{U}_x$:

$$I_f = \overbrace{\hat{U}_x^2 + \hat{U}_y^2}^{A} + \overbrace{2\hat{U}_x\hat{U}_y}^{B}\cos\varphi = A + B\cos\varphi$$

$$I_s = \overbrace{\hat{U}_x^2 + \hat{U}_y^2}^{A} + \overbrace{2\hat{U}_x\hat{U}_y}^{B}\cos(\varphi - \frac{\pi}{2}) = A + B\cos(\varphi - \frac{\pi}{2}) = A + B\sin\varphi$$

The respective offset A and the respective amplitude B of the photodiode signal are thus independent of the orientation of the polarization filter/polarizer.

Figure 3:
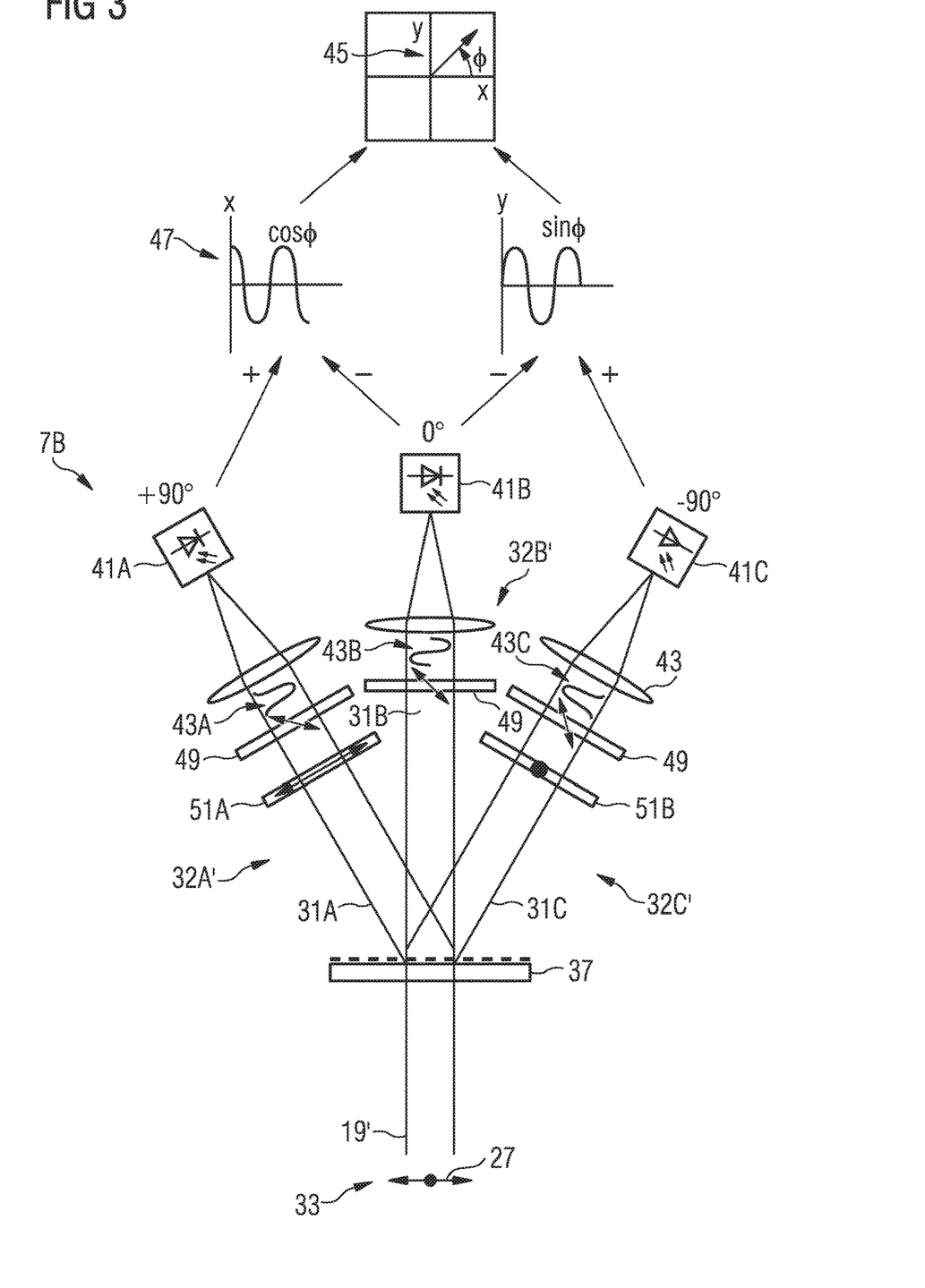
FIG. 3 is a schematic illustration of a second exemplary optical unit of a phase control system.

With the concept for the relative phase measurement disclosed herein and especially with the optical units with corresponding signal processing schematically sketched in FIGS. 1 to 3, the evaluated phase information is therefore also essentially independent from the intensities of the two amplified laser beams 17A, 17B.

Figure 4:
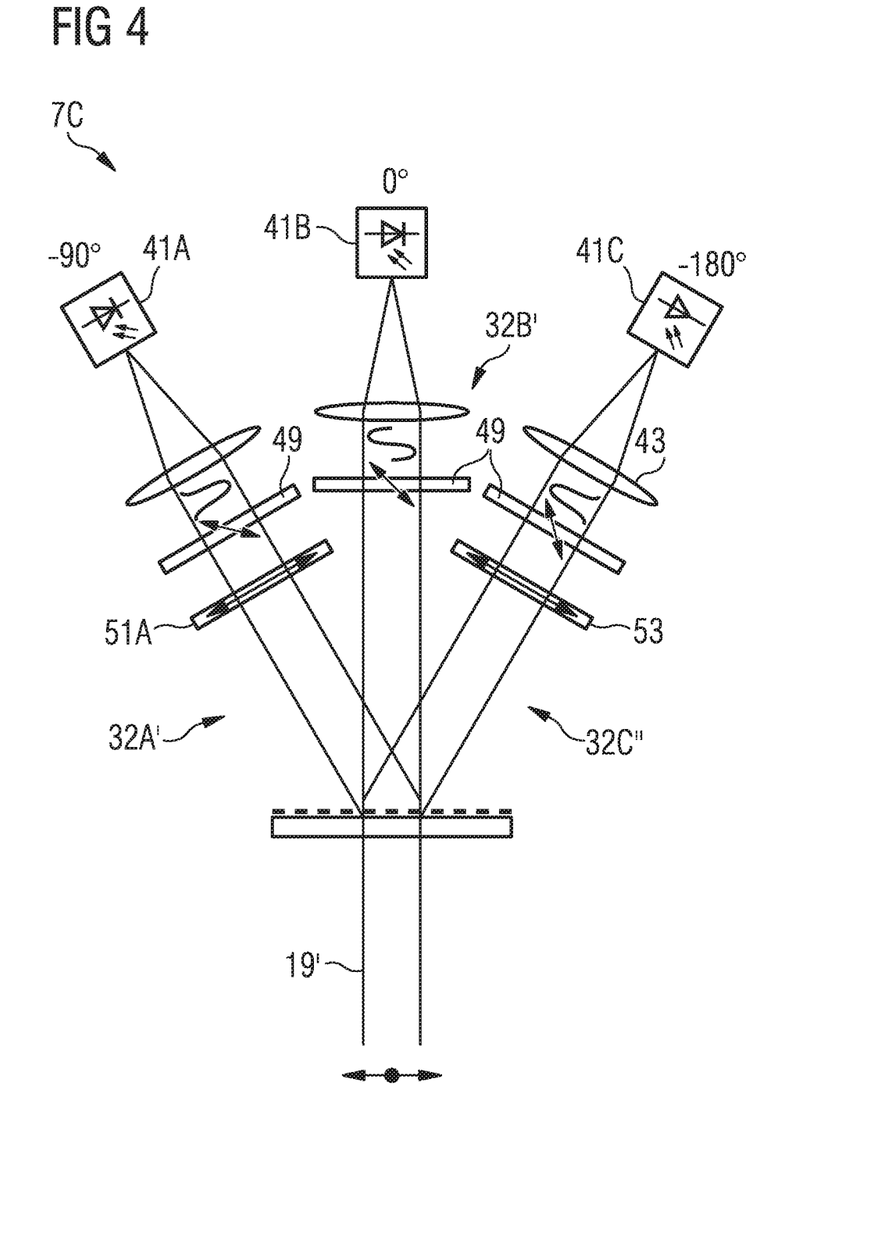
FIG. 4 is a schematic illustration of a third exemplary optical unit of a phase control system.

In FIGS. 3 and 4, alternative embodiments of optical units are shown schematically. The optical units also allow measurement procedures for an intensity-independent determined phase signal. In the following explanations, the reference signs are maintained as far as possible for essentially identical features.

In contrast to the setup shown in FIG. 2, there is no conversion into circular polarization performed at the beam input 33 for the partial beams underlying the measuring beam in the configuration of the optical unit 7B according to FIG. 3. Instead, only two of the three measuring beams, in this example the measuring beams 31A, 31C, are phase-shifted with wavelength plates. Thus, the measuring beam paths 32A' and 32C' each have a lambda quarter plate 51A, 51B, whereby the orientation of the fast/slow axes is rotated by 90° to each other. The latter is indicated in FIG. 3 by vectors in the drawing plane (lambda quarter plate 51A) or perpendicular to the drawing plane (lambda quarter plate 51B).

Furthermore, all three measuring beam paths 32A', 323, 32C' have identically oriented polarizers 49, i.e., the projection directions are identical for all three measuring beam paths 32A', 323, 32C'.

In the following, alternative embodiments are described, in which, in contrast to the optical unit 7A, no circular polarization is generated at the beam input 33 and no rotating polarization vector is generated. To bring the orthogonal polarization contributions in the measuring portion to interfere, e.g., a polarization filter can be placed in the beam path at 45°. Thereby, for example, a phase-dependent sine modulation is obtained at the middle photodiode. With the help of delay plates, a fixed offset phase can be set in each additional measuring beam path. For example, two lambda quarter plates can be used, with the fast axis of one plate being aligned horizontally and that of the other vertically. In this manner, a phase offset of +/−90° in the photodiode signal is obtained. Alternatively, other phase offsets can be produced, for example about 90° and 180°. In principle, any other offsets can be set in such setups, whereby at least three measuring beams are provided for quadrature signal processing.

The optical unit 7C shown in FIG. 4 represents a corresponding modification of the optical unit 7B shown in FIG. 3. The setups are essentially the same, so that the corresponding reference numerals were omitted for a better overview. The difference concerns the measuring beam path 32C'', in which a lambda half waveplate 53 causes a phase modification instead of the lambda quarter plate. The waveplates 51A, 53 are oriented with respect to the polarization in the respective measuring beam path 32A', 32C'' such that the fast axes are parallel to each other, and in particular (in the optimal case) at the same time parallel to one of the polarization directions of the measuring beams. Therefore, linear polarizations are phase-shifted to each other in the respective measuring beam paths 32A', 32C''. For this embodiment, there is therefore no rotating vector, but a change between linear polarization and circular polarization.

The configurations of the optical units 7B, 7C, for example, allow again the generation of a quadrature signal 47, with which the coherent combination can be controlled by an intensity-independent phase vector 45 that rotates as a function of the relative phase.

The evaluation unit 9 includes electronic components and/or a computer system for analog and/or digital evaluation, whereby the evaluation steps outlined above can be implemented in the framework of a control process. For example, the electrical signals of the photodiodes 41A, 41B, 41C first pass through a transimpedance amplifier, which outputs an electrical voltage at the output that is proportional to the light intensity. With the help of difference amplifiers, the sine and cosine components of the quadrature signal are formed from two voltage signals each. Additional suitable function groups can be used to adjust the amplitude and phase offset of the electrical signals, resulting in an ideal quadrature signal that can be sampled with an analog-to-digital converter (ADC). Further processing can be done digitally with a computer system. Alternatively, the output signals of the trans-impedance amplifiers can be sampled directly, whereby the adaptation and generation of the quadrature signal is then implemented in the computer system. In particular, the pure phase measurement via the photodetectors allows the off-set to be adjusted by adjusting the individual photodetector signals as well as the amplitude of the phase vector 45. Thereby, a substantially identical signal intensity can be electronically readjusted for the individual measuring beam paths.

In general, digital computer systems and/or analog signal processing can be used to calculate the phase position and/or the control signals for the delay device.

In the embodiments, projection directions rotated with respect to each other by $\pi/2$ in particular can be addressed, because these can lead to a good contrast. As the transmission of the polarizers is the same for rotations around $\pi$, for example at 0° and 180°, the period of the quadrature signal is lambda/2. That is, filter angles of 45°, 0°, and +45° correspond to a phase of 90°, 0°, +90° in the transmitted intensity signal. The angle values in the figures thus refer to the photodiode signals. In general, other non-identical polarization directions and projection directions can also be used in the optical units, for example, if more than three measuring beams are available, whereby an adjustment of the evaluation may be necessary, in particular without forming a quadrature signal.

In summary, the concept of measuring the relative phase disclosed herein in connection with FIGS. 1 to 4 allows a method for coherent combining of laser beams, in which two laser beams with different polarization states are superimposed on a common propagation path to form a sum laser beam. Thereby, the relative phase between the two laser beams is determined in an essentially intensity-independent homodyne measurement procedure, and an optical path length difference is adapted to stabilize the polarization state of the sum laser beam.

In this method, the essentially intensity-independent homodyne measurement method can include one or more of the following steps: splitting off a measuring portion of the sum laser beam, splitting the measuring portion into three measurement beams, forming three polarization states, and projecting the three polarization states onto a common projection direction, or projecting the three measurement beams in three projection directions. Further configurations are evident from the description of the embodiments of the laser system and the optical units.

In the following, further embodiments of a homodyne measurement are described, in which intensity measurements are made at corresponding phase offset positions of an interference pattern extending over a beam cross-section to provide photodetector signals with different phase offsets for phase control. For the measurement, coherent laser beams run particularly at an angle, so that overlapping areas of the laser beams have passed through different path lengths and adjacent phase offset positions have different path length differences, which lead to an interference strip pattern (interference fringes).

The angle between the directions of propagation of the laser beams can already be present at the beam input of the phase control system or, starting from collinear superimposed laser beams, it can be specifically generated. For example, similar to the superposition in FIG. 1 with two beam splitters, a corresponding angle can exist between the laser beams if the mirror 21 at the output of beam splitter 15A is adjusted accordingly.

Figure 5:
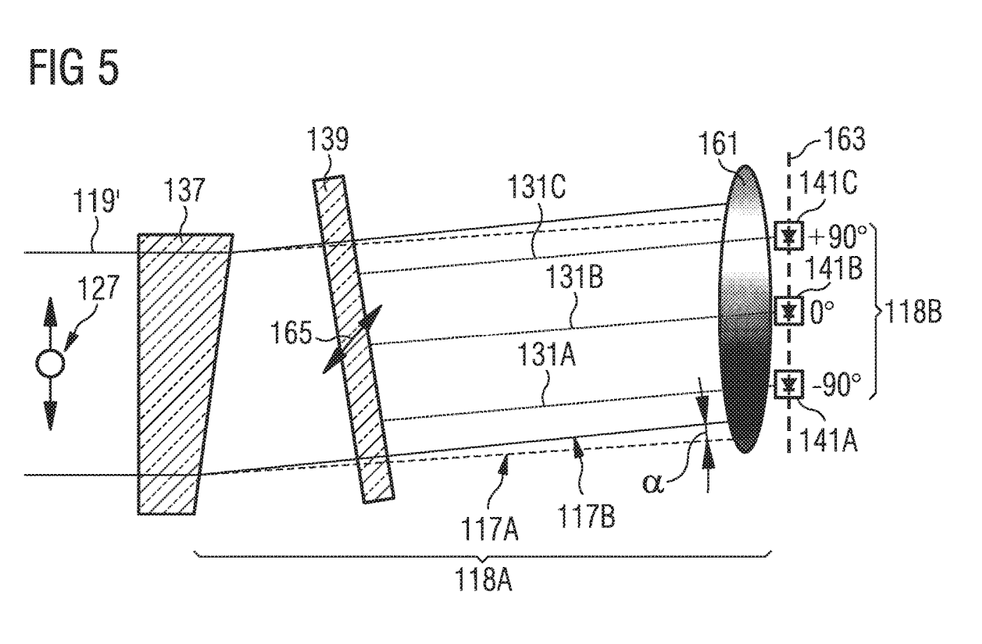
FIG. 5 is a schematic illustration of a further optical unit of a phase control system based on the evaluation of interference fringes.

FIG. 5 shows an exemplary approach for generating a splitting angle from a collinear superimposed measuring portion 119'. The measuring portion 119' is based on two, e.g., respectively, but and orthogonally to each other polarized (possibly amplified) laser beams. In FIG. 5, the linear polarizations are indicated schematically with arrows 127. A birefringent prism 137 causes an angle $\alpha$ between coherent laser beams 117A, 117B due to the polarization-dependent refraction. Due to the orthogonal polarizations of the laser beams 117A, 117B, a polarization filter 139 is inserted downstream of the birefringent prism 137 into the two largely superimposed beam paths to cause interference. The polarization filter 139 is aligned such that the laser beams 117A, 117B have downstream at least partially interfering polarization states. For example, in FIG. 5, a transmission direction 165 is indicated at 45° to the orthogonal linear polarization directions.

The generated (splitting) angle is selected such that the laser beams 117A, 117B only diverge slightly in a propagation section 118A, so that the laser beams 117A, 117B overlap in a central region 118B. There, an interference pattern 161 is created across the beam cross-section in the direction of the angle $\alpha$. In FIG. 5, an interference pattern is indicated schematically in the drawing plane from bottom to top.

In some cases, the angles range from 0.01° to 0.02°, so that—for beam diameters from, for example, 3 mm to 20 mm—phase offset differences of, e.g., ±90°, lie side by side at a distance of, e.g., 1 mm, and can be measured with corresponding photodetectors.

For illustration, three measuring beam regions 131A, 131B, 131C are shown in FIG. 5. Between two adjacent of the three measuring beam regions 131A, 131B, 131C, there is a phase offset difference of 90° in the interference pattern 161. With three photodetectors 141A, 141B, 141C (e.g., photodiodes), which are arranged in a measuring plane 163, corresponding photodetector signals can be fed to an evaluation unit for evaluation and generation of a control signal. The control signal corresponds to the relative phase between the coherent laser beams and, accordingly, can be used to control a delay device. For example, the control signal can be generated as in the signal processing described in connection with FIGS. 1 to 4.

In some configurations, which are based on the evaluation of interference fringes, for example, a line or pixel sensor can be used besides using individual detectors, whereby the line or pixel sensor is positioned in the measurement plane.

Furthermore, tilting the measuring plane used (in the plane spanned by the angle) causes a projection of the fringe pattern onto this plane, whereby the fringe distance can be adjusted in the measuring plane, as it becomes larger with increasing angle. Tilting the employed measuring plane can be used, for example, to set the phase offset between the individual detectors. Tilting is useful, for example, if a detector unit with a predetermined distance is to be used for a smaller fringe period. Then, the tilt angle is increased (starting from the orientation orthogonal to the laser beam) until the fringe period and detector distance fit together.

In summary, the concept of measuring the relative phase using interference fringes, as disclosed in connection with FIG. 5, also permits a method for coherent combining of laser beams, in which two laser beams with different polarization states are superimposed on a common propagation path to form a sum laser beam. In this method, the essentially intensity-independent homodyne measurement procedure can include the following steps—in summary: superimposing two coherent laser beams with interfering polarization states such that different phase offsets are assigned to at least three measuring beam regions 131A, 131B, 131C in the beam cross-section of the superimposed coherent laser beams; determining a relative phase between the two laser beams based on the at least three measuring beam regions 131A, 131B, 131C, where in particular intensity values for each of the at least three measuring beam regions 131A, 131B, 131C are detected and provided as input quantities for signal processing, in particular for quadrature signal processing; adjusting an optical path length difference between the two laser beams prior their superposition to stabilize the interference pattern based on the determined relative phase.

Examples of amplifier units are fiber amplifier units, e.g., a crystal fiber amplifier unit, titanium:sapphire amplifier units, rod amplifier units, plate amplifier units, disk amplifier units, optical parametric amplifier units, and semiconductor amplifier units, and in particular regenerative, single-pass, and/or multi-pass amplifier units.

Thus, (pulsed or cw) amplifier systems, e.g., Ti:sapphire-based or fiber laser-based amplifier systems, e.g., in multi-pass configuration or slab based, can be coherently combined using the homodyne and essentially amplitude-independent phase measurement described herein. Repetition rates of pulsed laser systems can range from one or a few Hz up to 100 kHz or even up to one or more MHz. Exemplary pulse durations are in the ns, ps, and fs ranges. Exemplary regenerative laser systems and regenerative laser stages, which can be coherently combined with the concepts disclosed herein, are, e.g., disclosed in "High-repetition-rate picosecond pump laser based on a Yb:YAG disk amplifier for optical parametric amplification," T. Metzger at al., Opt. Lett. 34, 2123-2125 (2009). An exemplary fiber amplifier-based laser system is described in the above mentioned publication by A. Klenke et al. (2011).

Furthermore, the concept described here can also be applied to scalable optical amplifier arrangements, as disclosed, for example, in DE 10 2010 052 950 A1. In particular, after two or more pairs of amplifier systems have been coherently combined, respectively, also the superimposed output beams can be coherently superimposed again. In this manner, appropriately scaled output powers can be achieved.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

Other Embodiments

A number of embodiments of the invention have been described. Nevertheless, it will be understood that various modifications may be made without departing from the spirit and scope of the invention. Accordingly, other embodiments are within the scope of the following claims.

What is claimed is:

1. A phase control system for controlling a relative phase of two laser beams of a laser system, the phase control system comprising:
an optical system including:
a beam input configured to receive a measuring portion of two coherent laser beams that are to be superimposed collinearly to form a sum laser beam, and
a beam splitter configured to generate at least three measuring beams from the measuring portion of the two coherent laser beams, wherein the at least three measuring beams propagate on at least three associated measuring beam paths, and wherein the associated at least three measuring beam paths are configured to generate different phase offsets of the at least three measuring beams by projecting the at least three measuring beams onto at least three polarization directions;
at least three photodetectors coupled to the at least three measuring beam paths and configured to output at least three photodetector signals corresponding to the at least three measuring beams having the different phase offsets;
an evaluation device configured to generate a control signal based on the at least three photodetector signals, wherein the control signal corresponds to a relative phase between the two coherent laser beams based on an evaluation of a polarization state of the measuring portion; and
a delay device configured to be inserted into a beam path of at least one of the two coherent laser beams to be collinearly superimposed, wherein the delay device has an optical path length adjustable in dependence on the control signal.

2. The phase control system of claim 1, wherein each of the at least three measuring beam paths of the measuring portion is configured to project a polarization state of a respective measuring beam of the at least three measuring beams onto a polarization direction.

3. The phase control system of claim 1, wherein the beam splitter is configured as one of a non-polarizing beam splitter, a diffraction grating, and a partially reflecting mirror combination.

4. The phase control system of claim 1, wherein at least one of the at least three measuring beam paths comprises a polarizer configured to project a polarization state of the associated measuring beam onto a polarization direction, or a focusing lens configured to focus the associated measuring beam onto a respective photodetector, or both.

5. The phase control system of claim 1, wherein the optical system comprises a lambda quarter waveplate arranged downstream of the beam input and upstream of the beam splitter, and wherein at least three polarization directions associated with the projections of the at least three measuring beams are rotated with respect to each other by 45° or 90°, respectively.

6. The phase control system of claim 1,
wherein each of the at least three measuring beam paths is configured respectively to project a polarization state specific to the measurement beam path onto a common polarization direction, wherein the measurement beam path comprises a linearly polarization filter, and wherein the transmitted polarization directions of the linearly polarization filters are oriented substantially identically, and
wherein, for generating the polarization states specific to the measuring beam paths, two of the at least three measuring beam paths comprise a phase-shifting optical device configured to cause a defined relative phase delay of one of the polarization directions, resulting in phase-shifted photodetector signal curves.

7. The phase control system of claim 6,
wherein, for generating the polarization states specific to the measuring beam paths, each of two of the at least three measuring beam paths comprises a respective lambda quarter waveplate, and
wherein the lambda quarter waveplates are rotated in their orientations with respect to polarization in the respective measuring beam paths by 90° to each other.

8. The phase control system of claim 6,
wherein, for generating the polarization states specific to the measuring beam paths, one of the at least three measuring beam paths comprises a lambda quarter waveplate and one of the at least three measurement beam comprises a lambda half waveplate, and
wherein the waveplates are aligned in their orientations with respect to polarization in the respective measuring beam paths such that fast axes of the waveplates are parallel to one another.

9. The phase control system of claim 1, wherein the evaluation device is further configured to convert time variations of the relative phase between the two coherent laser beams into a directional change of a phase vector.

10. The phase control system of claim 1, wherein the evaluation device is configured to form a difference of two pairs of photodetector signals and comprises a quadrature signal processing device configured to perform quadrature signal processing based on the difference.

11. The phase control system of claim 1, wherein the delay device is
configured both for a rough adaptation of the optical path length and for a fine adaptation of the optical path length.

12. The phase control system of claim 11, wherein the delay device comprises one or more of: a motor-driven displacement device of a folding mirror or retro-reflector, a piezomechanical displacement device of a folding mirror or retro-reflector, and an acousto-optical delay device configured to stabilize or specifically change phase positions of the input beams.

13. A phase control system for controlling a relative phase of two laser beams of a laser system, the phase control system comprising:
an optical system including:
a beam input configured to receive measuring portions of two coherent laser beams, which are to be superimposed collinearly to form a sum laser beam, and
a propagation section in which the measuring portions of the two coherent laser beams propagate spatially superimposed at an angle with respect to each other and form at least three measuring beam regions, wherein the at least three measuring beam regions are configured to generate different phase offsets of the associated measuring beam regions by path length differences;
at least three photodetectors configured to output at least three photodetector signals, wherein each of the photodetectors is assigned to a respective one of the measuring beam regions, and the photodetector signals correspond to the measuring beam regions at the different phase offsets;
an evaluation device configured to generate a control signal based on the at least three photodetector signals, wherein the control signal corresponds to a relative phase between the coherent laser beams based on an evaluation of an interference behavior of the measuring portions; and
a delay device configured to be inserted into a beam path of at least one of the two laser beams to be collinearly superimposed, wherein the delay device has an optical path length adjustable in dependence on the control signal.

14. The phase control system of claim 13,
wherein the propagation section of the optical system is configured such that the measuring portions of the two coherent laser beams propagate in the propagation section at the angle and are spatially superimposed in a central region, and
wherein the optical system further comprises a polarization filter arranged in the propagation section and configured to generate interfering polarization states of the two coherent laser beams, wherein the interfering polarization states cause an interference pattern in a direction given by the angle, and wherein the interference pattern relates the different phase offsets to the at least three measuring beam regions.

15. The phase control system of claim 13, wherein the optical system further comprises a polarization-state dependent beam splitter configured to generate the angle between the measuring portions of the two coherent laser beams, such that the measuring portions of the two coherent laser beams form the at least three measuring beam regions in the central region.

16. The phase control system of claim 13, wherein the optical system further comprises:
a first polarization-state dependent beam splitter to separate polarized beam portions of the measuring portions;
a second beam splitter, which is polarization state-dependent or non-polarization state-dependent; and
optical devices configured to redirect the separated polarized beam portions onto the second beam splitter, wherein at least one of the optical devices is arranged such that the beam portions superimposed at an output of the second beam splitter enter the propagation section at the angle.

17. A laser system for providing a sum laser beam based on coherent combination, the laser system comprising:
a laser beam source for providing a first laser beam and a second laser beam that is coherent with the first laser beam;

an optical combiner for collinear superposition of a first beam path of the first laser beam and a second beam path of the second laser beam for generating a sum laser beam, wherein the first laser beam and the second laser beam are superposed in a first polarization state and in a second polarization state, respectively, wherein the second polarization state is different from the first polarization state; and an optical system including:
  a beam input configured to receive one or more measuring portions of the coherent first and second laser beams, which are to be superimposed collinearly to form a sum laser beam; and
  a beam splitter configured to generate at least three measuring beams from the one or more measuring portions of the coherent first and second laser beams, the at least three measuring beams propagating on at least three associated measuring beam paths, wherein the associated at least three measuring beam paths are configured to generate different phase offsets of the at least three measuring beams by projecting the at least three measuring beams onto at least three polarization directions, or a propagation section in which the one or more measuring portions of the coherent first and second laser beams propagate spatially superimposed at an angle with respect to each other and form at least three measuring beam regions, wherein the at least three measuring beam regions are configured to generate different phase offsets of the associated measuring beam regions by path length differences;

at least three photodetectors coupled to the at least three measuring beam paths or the at least three measuring beam regions and configured to output at least three photodetector signals corresponding to the at least three measuring beams or to the at least three measuring beam regions having the different phase offsets;

an evaluation device configured to generate a control signal based on the at least three photodetector signals, wherein the control signal corresponds to a relative phase between the two coherent laser beams based on an evaluation of a polarization state of the measuring portions or an evaluation of an interference behavior of the measuring portions; and a delay device configured to be inserted into a beam path of at least one of the two coherent laser beams to be collinearly superimposed, wherein the delay device has an optical path length adjustable in dependence on the control signal, wherein the delay device is provided in the first beam path of the first laser beam or in the second beam path of the second laser beam or both, wherein a measuring portion of the sum laser beam or measuring portions of the first laser beam and the second laser beam which propagate at an angle with respect to each other, is or are coupled into the beam input of the optical system as the one or more measuring portions of the coherent first and second laser beams.

18. The laser system of claim 17,
wherein the evaluation device of the phase control system is configured to determine the relative phase between the first laser beam and the second laser beam, the relative phase characterizing a polarization state of the sum laser beam, and wherein the determination is substantially independent of intensity fluctuations in the first laser beam or in the second laser beam or both, and wherein the delay device is configured to adjust a relative optical path difference between the first laser beam and the second laser beam in dependence on the control signal for stabilizing the polarization state of the sum laser beam.

19. The laser system of claim 17, wherein the laser beam source comprises:
  a seed laser beam source configured to provide a first seed laser beam and a second seed laser beam that is coherent with the first seed laser beam;
  a first amplifier branch comprising a first optical amplifier unit for generating a first amplified laser beam based on the first seed laser beam; and
  a second amplifier branch comprising a second optical amplifier unit for generating a second amplified laser beam based on the second seed laser beam,
  wherein the first amplified laser beam and the second amplified laser beam are the first laser beam and the second laser beam that are to be superimposed collinearly to form the sum laser beam, and
  wherein the delay device is provided in the first amplifier branch or the second amplifier branch or both.

20. The laser system of claim 19, wherein the first optical amplifier unit or the second optical amplifier unit or both comprise a fiber amplifier unit, a crystal fiber amplifier unit, a titanium:sapphire amplifier unit, a rod amplifier unit, a plate amplifier unit, a disk amplifier unit, an optical parametric amplifier unit, a semiconductor amplifier unit, or a regenerative and/or single-pass amplifier unit and/or multiple-pass amplifier unit.

21. The laser system of claim 17, wherein the first polarization state and the second polarization state are linear polarizations that are essentially orthogonally aligned to each other,
  wherein the optical system has a lambda quarter waveplate configured to convert the linear polarizations into circular polarizations rotating to left or right, respectively,
  wherein the optical system comprises a diffraction grating for distributing the one or more measuring portions onto the three measuring beam paths,
  wherein the three measuring beam paths are each configured as input variables for quadrature signal processing for respectively projecting the polarization states onto three polarization directions rotated by 45° or 90° with respect to each other, and
  wherein the three measuring beam paths each have a polarizer, respectively, projection directions of which are rotated by 45° or 90°, such that optical path length changes of the first laser beam and the second laser beam result in phase-shifted photodetector signal changes.

22. The laser system of claim 17, wherein the first polarization state and the second polarization state are linear polarizations that are essentially orthogonally aligned to each other,
  wherein the optical system comprises a diffraction grating for distributing the one or more measuring portions onto the three measuring beam paths,
  wherein each of the three measuring beam paths is configured as an input variable for quadrature signal processing for respectively projecting a polarization state specific to the measuring beam path onto a common polarization direction, and
  wherein each of the three measuring beam paths comprises a polarizer and projection directions of the polarizers are substantially identical, and wherein each of two of the three measuring beam paths has a respective lambda quarter waveplate for generating the polarization state specific to the measuring beam path, and the lambda quarter waveplates are rotated by 90° relative to one another, or wherein two of the three measuring beam paths comprise a lambda quarter waveplate or a lambda half-waveplate, so that optical path length changes of the first laser beam and the second laser beam result in phase-shifted photodetector signal changes.

23. A method of coherently combining laser beams, the method comprising:
   superimposing two coherent laser beams with different polarization states on a common propagation path to form a sum laser beam;
   determining a relative phase between the two coherent laser beams in a substantially intensity-independent homodyne measurement procedure; and
   adjusting an optical path length difference between the two coherent laser beams before the sum laser beam is formed to stabilize a polarization state of the sum laser beam based on the determined relative phase.

24. The method of claim 23, wherein the essentially intensity-independent homodyne measurement procedure comprises:
   providing a measuring portion of the sum laser beam;
   splitting the measuring portion into at least three measuring beams;
   forming at least three polarization states for the at least three measuring beams;
   projecting the at least three polarization states of the at least three measuring beams onto a common projection direction; and
   acquiring intensity values for each of the at least three measuring beams to provide the intensity values as input quantities for signal processing.

25. The method of claim 23, wherein the essentially intensity-independent homodyne measurement procedure comprises:
   providing a measuring portion of the sum laser beam;
   splitting the measuring portion into at least three measuring beams; and
   projecting the at least three measuring beams in at least three projection directions; and
   acquiring intensity values for each of the at least three measuring beams to provide the intensity values as input quantities for signal processing.

26. A method of coherently combining laser beams, the method comprising:
   superimposing two coherent laser beams with interfering polarization states such that at least three measuring beam regions in a beam cross-section of the superimposed coherent laser beams relate to different phase offsets, wherein the interfering polarization states cause an interference pattern relating the different phase offsets to the at least three measuring beam regions;
   determining a relative phase between the two coherent laser beams based on the at least three measuring beam regions, wherein intensity values for each of the at least three measuring beam regions are acquired and provided as input quantities for signal processing; and
   adjusting an optical path length difference between the two coherent laser beams prior the superposition to stabilize the interference pattern based on the determined relative phase.

* * * * *